(No Model.)  2 Sheets—Sheet 1.
P. DIEHL.
SELF LUBRICATING CLUTCH.
No. 511,413. Patented Dec. 26, 1893.
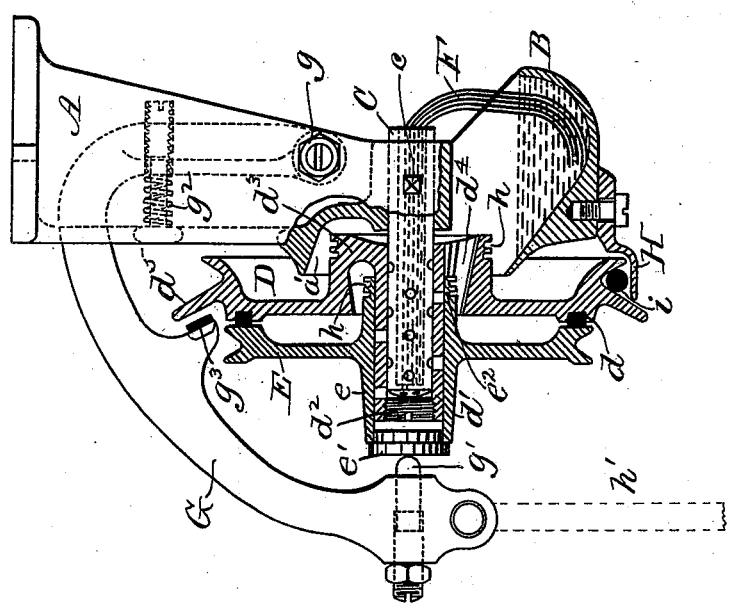
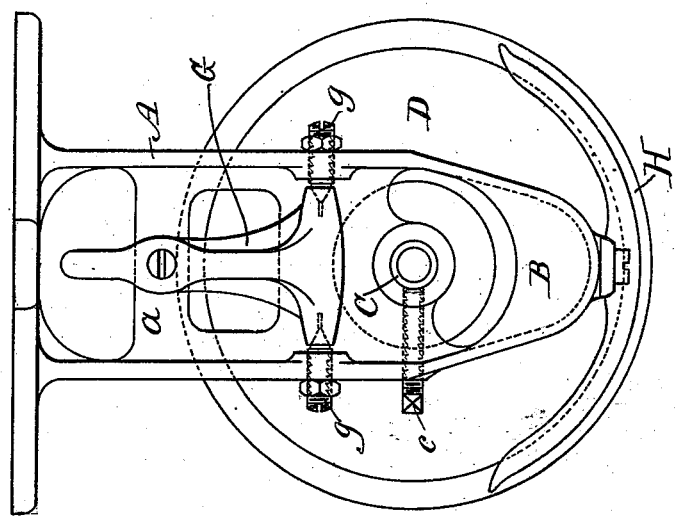
WITNESSES:
INVENTOR:
Philip Diehl
BY
ATTORNEY.
THE NATIONAL LITHOGRAPHING COMPANY,
WASHINGTON, D. C.

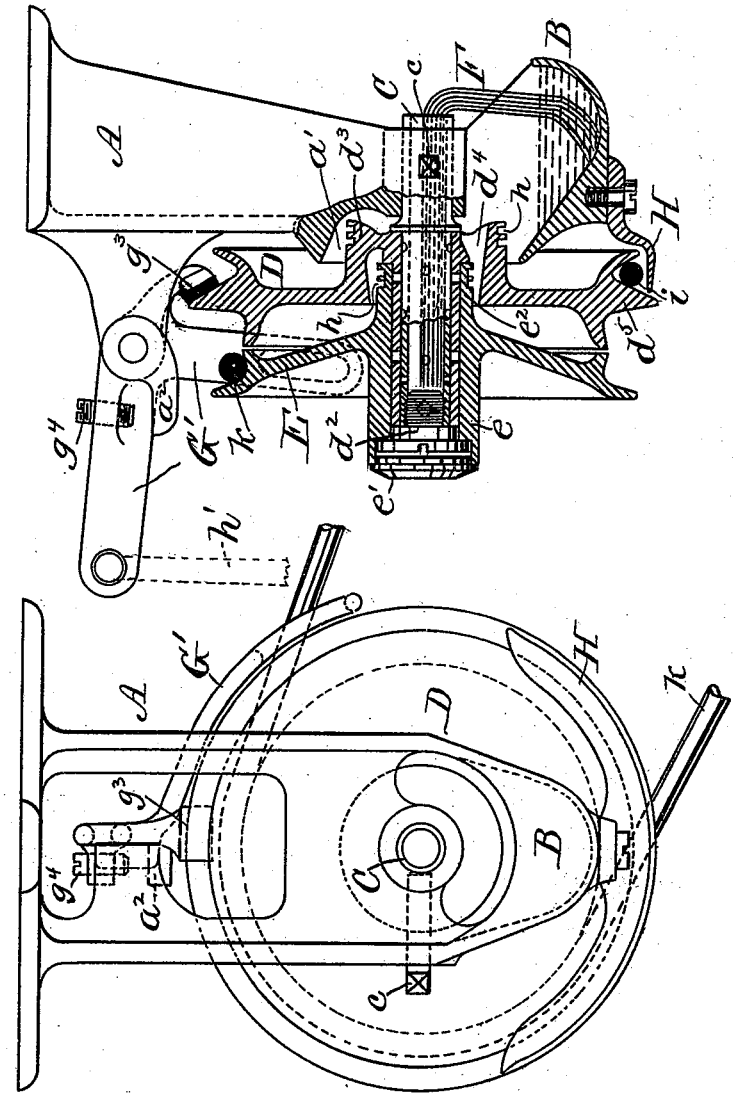

UNITED STATES PATENT OFFICE.

PHILIP DIEHL, OF ELIZABETH, NEW JERSEY, ASSIGNOR TO THE SINGER MANUFACTURING COMPANY OF NEW JERSEY.

SELF-LUBRICATING CLUTCH.

SPECIFICATION forming part of Letters Patent No. 511,413, dated December 26, 1893.

Application filed July 19, 1893. Serial No. 480,914. (No model.)

*To all whom it may concern:*

Be it known that I, PHILIP DIEHL, a citizen of the United States, residing at Elizabeth, in the county of Union and State of New Jersey, have invented certain new and useful Improvements in Power-Transmitters, of which the following is a specification, reference being had therein to the accompanying drawings.

My invention relates to power transmitting devices to be used for driving sewing or other light machines, and it has for its object to provide a power-transmitting device of such a character that the driving and driven pulleys may be freely lubricated, so that they will run as easily as possible, the construction of the parts being such that the surplus oil will be returned to the oil cup and will thus be prevented from escaping to the floor, or coming in contact with the friction faces of the pulleys, and thus the objection of soiling the work or the floor of the shop will be avoided. To this end my improved driving-attachment or power-transmitter comprises a supporting bracket having a chambered stud which supports the pulleys and which is provided with an oil cup. Said chambered stud is furnished with a wick through which, by capillary attraction, the oil from the oil cup is led to the pulley bearing; the said stud being preferably hollow and being provided with perforations through which the oil can pass outward to its exterior surface. Mounted on said stud, so as to run freely thereon, is a pulley which is the pulley to be driven when the power is to be usefully applied, the said pulley having a hub the inner end of which extends into a housing, forming an oil guard chamber, and over the said oil cup, and the said hub is provided with an internal tapered recess forming an oil guard chamber for the hub of the driving pulley or idler. Extending outwardly from said hub of the driven pulley is a sleeve on which the driving pulley or idler is mounted, said sleeve having perforations for the passage of oil. The hub of the driving pulley is closed at its outer end by a button or plug, and its inner end is extended into the oil guard chamber in the hub of the driven pulley. From this construction it results that any surplus oil from the interior of the hub of the driving pulley will be prevented from escaping from the outer end of said hub and can therefore only escape from the inner end of said hub which extends within the said oil guard chamber of the driven pulley; and as it may drip or be thrown into the said oil guard chamber it will be caused by centrifugal action, or by gravity, to return to the oil cup; also any surplus oil from the bearing of the driven pulley can only escape from the inner end thereof and will be caused by gravity or centrifugal force to be returned to the oil cup. To prevent the oil from creeping outward on the inner ends of the hubs of both the driven and driving pulleys the exteriors of said inner ends of said hubs are preferably provided with one or more annular grooves.

As a means for moving the driving pulley into frictional contact with the driven pulley (when my invention is embodied in a friction-clutch power transmitter) I preferably pivot to the supporting bracket an operating lever having a projection by which the driving pulley may be forced against the driven pulley, said lever being operated by means of a suitable treadle or other connection and being provided with a brake which is normally held in contact with the flange on the driven pulley by a spring operating on said lever and which brake serves to arrest the movements of the driven pulley as soon as the pressure on the treadle connection of said lever is relieved.

In the accompanying drawings, Figure 1 is an end view of my improved driving attachment constructed as a friction clutch device, and Fig. 2 is a sectional side view thereof. Figs. 3 and 4 are end and sectional side views, respectively, of a slightly modified form of my invention.

Referring more particularly to Figs. 1 and 2, A denotes a hanger or bracket which is to be attached to the under side of a bench or table on which the machine to be driven is mounted, the said bracket being provided at its lower portion with an oil cup B. Attached to the bracket A (by means of a set screw *c* or other suitable means) is a chambered stud C (preferably made as a perforated sleeve) on which is loosely mounted the driven pulley D the outer face of which, as herein shown, is provided with a friction ring $d$ of leather or other suitable material. The hub of the said pulley D is extended outward in the form of a sleeve $d'$ which is provided with perforations or oil passages and on which is mounted the driving pulley E, the outer end of said sleeve $d'$ being preferably closed by the screw plug $d^2$. The inner end portion $d^3$ of the hub of the driven pulley is extended inward into an oil guard chamber $a'$, formed in the bracket or hanger A, and over the oil cup B, and the said hub is provided with an oil guard chamber $d^4$ made tapering and having its largest diameter at the inner end of said hub; or, in other words, the said chamber $d^4$ grows larger toward the end of said hub which extends over the oil cup. The outer end of the hub $e$ of the driving pulley E is closed by a plug $e'$, while the inner end $e^2$ of said hub is extended into the chamber $d^4$ formed in the hub of the driven pulley D. The oil from the oil cup B is led, by capillary attraction, to the interior of the perforated sleeve or chambered stud C by a wick or conductor F placed in said sleeve or stud and depending into the said oil cup.

G denotes an operating lever pivotally supported on the bracket A by the center screws $g$, the said lever being provided near its free end with a plug or projection $g'$ which, when the said lever is drawn downward, as by a treadle rod $h'$, bears centrally on the plug $e'$ carried by the hub of the driving pulley E, as shown in Fig. 2, which figure represents the pulleys in the positions they occupy when the driven pulley is running. When the said operating lever G is released the spring $g^2$, which is interposed between the bar or part $a$ of the bracket A and the said lever, raises the latter so as to bring the brake $g^3$ carried thereby into contact with the flange $d^5$ of the driven pulley D, thereby arresting the movement of the said driven pulley at the moment the pressure on the driving pulley is relieved.

H denotes a dress guard which is attached to the bottom of the oil cup portion of the bracket A, the purpose of said guard being to cover the belt flange in which runs the belt $i$ through which the motion of the driven pulley D is conveyed to the sewing or other machine to be driven.

In the slightly modified form of my invention shown in Figs. 3 and 4 the pulley E runs as an idler and the belt $k$ is transferred from said pulley to a flange or rim on the driven pulley D, when use of the power is desired, by a belt-shifter G' pivoted to the bracket or hanger A, said belt-shifter being operated by a treadle rod $h'$ or in any other suitable manner. To limit the movement of the belt-shifter when the belt $k$ is transferred to the driven pulley E the upper arm of the belt-shifter may be provided with an adjustable stop-screw $g^4$ arranged to engage a projection $a^2$ formed on the bracket or hanger A, the brake $g^3$ extending from the belt-shifter and engaging a flange on the pulley D serving to limit the movement of the shifter when the belt is transferred to the pulley E. This form of my invention may be employed either as an "under-driver" to be placed beneath a work-bench or table, or as an overhead "counter" power-transmitter.

From the construction of the parts as hereinbefore described it will be apparent that the oil by which the driving and driven pulleys are lubricated will be prevented from escaping from the outer ends of their hubs, and any surplus oil which may gather at the inner ends of said hubs will be returned by centrifugal action, if the parts are in motion, or by gravity, if the parts are at rest, to the oil cup B, one or more annular grooves $h$ being preferably provided at the inner ends of the hubs of the said pulleys to prevent the oil from creeping along the same.

Owing to the fact that the tapered chamber $d^4$ in the hub of the driven pulley D is flared or grows larger toward the inner end of said hub centrifugal force will tend to force the oil which may collect in said recess inward toward the oil cup if the said pulley be in rotation, or the oil will naturally run down the inclined plane formed by this flaring recess if the pulley be at rest, and will thus be conveyed back into the oil cup.

It has been found in practice that with my improved power-transmitter or driving-attachment constructed as hereinbefore described it is utterly impossible for the surplus oil to escape or be thrown to the floor, and the pulleys may be run at any desired rate of speed and every particle of surplus oil will be reliably returned to the oil cup.

Having thus described my invention, I claim and desire to secure by Letters Patent—

1. A driving attachment or power transmitter comprising the combination with a suitable hanger or bracket provided with an oil guard chamber and an oil cup, of a chambered stud supported by said bracket, a pulley having a hub one portion of which extends into said oil guard chamber and over said oil cup, said pulley having an oil guard chamber formed in its hub and having also, extending outward from said hub, a perforated sleeve, and a second pulley mounted on said sleeve and having one end of its hub extended within the oil guard chamber of the first named pulley.

2. A driving attachment or power transmitter comprising the combination with a suitable hanger or bracket provided with an oil guard chamber and an oil cup, of a chambered stud supported by said bracket, a pulley having a hub one portion of which extends into said oil guard chamber and over said oil cup, said pulley having a tapering oil guard chamber formed in its hub and having also, extending outward from said hub, a perforated sleeve, and a second pulley mounted on said sleeve and having one end of its hub extended within the oil guard chamber of the first named pulley, the portions of the hubs of said pulleys extending within said oil-guard chambers being provided with exterior grooves.

3. A driving attachment or power transmitter comprising the combination with a suitable support or bracket provided with an oil guard chamber, an oil cup and a chambered stud, of a pulley mounted upon the said stud and provided at its hub with an oil guard chamber or flaring recess and with a perforated sleeve portion, the inner end of the hub of said pulley being extended into the said oil guard chamber of said bracket and over the said oil cup, a second pulley mounted upon the perforated sleeve portion of the first named pulley and the hub of which is closed at one end while the other or inner end of said hub extends within the oil guard chamber of the first named pulley.

4. A driving attachment or power transmitter comprising the combination with a suitable support or bracket provided with an oil guard chamber, an oil cup and a chambered stud, of a pulley having an oil guard chamber formed in its hub and having one portion of the latter extended into the oil guard chamber of said bracket and over said oil cup, said pulley having extending outward from its hub a perforated sleeve, a second pulley mounted on said perforated sleeve and having one end of its hub extended within the oil guard chamber formed in the hub of the first named pulley, and having the other end of its hub closed, an operating lever pivoted at one end to the said support or bracket and having near its opposite end a projection by which the said pulleys may be forced into frictional contact with each other, and having also, between its ends, a brake by which the movement of the driven pulley may be arrested, and a spring by which the said brake may be forced into contact with the driven pulley when said pulleys are released from frictional pressure.

5. The combination with the support or bracket A provided with the oil guard chamber $a'$, the oil cup B and the perforated sleeve or chambered stud C, of the driven pulley D mounted on said sleeve or stud and provided with a chambered hub the inner end $d^3$ of which extends into said chamber $a'$ and over the said oil cup, said pulley having also the perforated sleeve $d'$, the driving pulley E mounted on the said sleeve $d'$ and having the inner end of its hub extended within the recess or oil guard chamber $d^4$ of the driving pulley and the outer end of its hub closed, the operating lever G by which said pulleys are forced into frictional contact with each other, and a spring by which said lever may be moved to release the frictional contact of said pulleys.

6. The combination with the support or bracket A provided with the oil guard chamber $a'$, the oil cup B and the perforated sleeve or chambered stud C, of the driven pulley D mounted on said sleeve or stud and provided with a chambered hub the inner end $d^3$ of which extends into said oil guard chamber $a'$ and over the said oil cup, said pulley having also the perforated sleeve $d'$, the driving pulley E mounted on the said sleeve $d'$ and having the inner end of its hub extended within the oil guard chamber $d^4$ of the driven pulley and the outer end of its hub closed, the lever G pivoted to said support or bracket and provided with a projection $g'$, which is to engage the closed end of the driving pulley and force it into frictional contact with the driven pulley, and with the brake portion $g^3$ which is to arrest the movement of the driven pulley, and the spring $g^2$ serving to lift said lever when the treadle pressure thereon is released.

In testimony whereof I affix my signature in presence of two witnesses.

PHILIP DIEHL.

Witnesses:
JAMES G. GREENE,
WALTER J. PETTIT.